Aug. 19, 1969     H. HOLLENDIECK ET AL     3,462,099
VTOL AIRCRAFT
Filed March 21, 1966
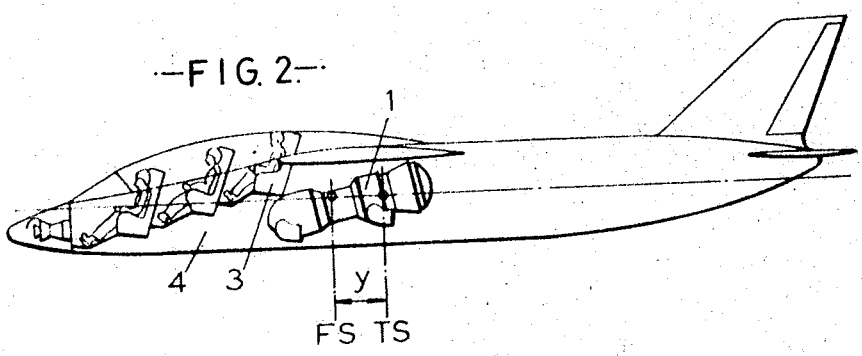
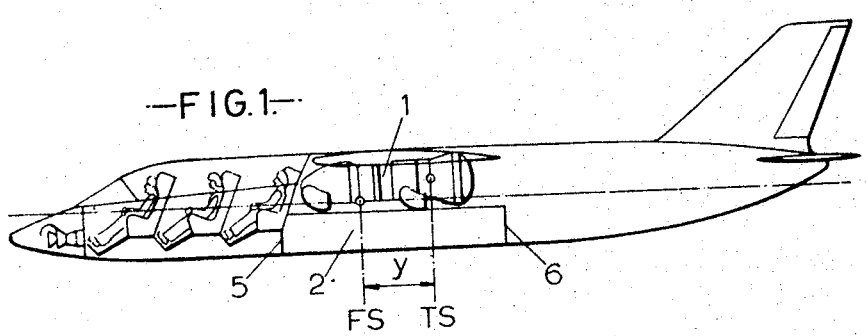
INVENTORS
Hans Hollendieck
Hans Justus Meier &
Erich A.W. Rutzen

United States Patent Office 3,462,099
Patented Aug. 19, 1969

3,462,099
VTOL AIRCRAFT
Hans Hollendieck, Bremen-Huchting, and Hans Justus Meier and Erich Adolf Wilhelm Rutzen, Bremen, Germany, assignors to Vereinigte Flugtechnische Werke Gesellschaft mit beschrankter Haftung, Bremen, Germany
Filed Mar. 21, 1966, Ser. No. 535,931
Claims priority, application Germany, Mar. 26, 1965,
V 28,143
Int. Cl. B64c 29/00; B64d 27/20
U.S. Cl. 244—55                                4 Claims

ABSTRACT OF THE DISCLOSURE

A power unit arrangement for a VTOL aircraft having a relatively heavy elongated jet power unit arranged in the interior of the fuselage and centrally to the medial plane of the fuselage near the centre of gravity of the aircraft, with the centre of gravity of the power unit located on the end of the power unit, two thrust jets, preferably swivel jets with jet deflection arranged on both sides of the fuselage, said power unit installed exhaust first forwardly with its centre of gravity being installed rearwardly in the fuselage with its centre of gravity located behind the centre of gravity of the aircraft, at least a distance sufficient to cause a tail heavy torque about the transverse axis of the aircraft.

Background of the invention

Field of the invention.—The present invention concerns a VTOL aircraft having an elongated jet propulsion unit in the interior of the fuselage and thrust nozzles with jet deflection, e.g. swivel jets fed mutually by this power unit. The thrust nozzles are arranged in pairs on both sides of the fuselage, the front pair of jets being spaced forwards of the centre of gravity of the aircraft whilst the rear pair of jets are spaced rearwards thereof, "forwards" and "rearwards" referring to relative placement along the length of the fuselage. When reference is made herein to the "centre of gravity of the aircraft," the weight centre of all parts of the aircraft is meant, the power unit included.

Description of the prior art

Such aircraft are already known. They either have a double power unit, whereby two elongated jet power units are arranged directly juxtaposed as a structural unit in the fuselage, or they have a single elongated power unit usually in the form of a by-pass jet power unit for all four thrust nozzles.

The charger is located at the front in most known power units. Since the charger is very heavy, it produces an unfavourable centre of gravity position for installation in an aircraft fuselage. Some aircraft besides having deflectable, thrust nozzles at their fuselage sides, also have to have a pure lifting blower acting downwardly and mounted in the interior of the fuselage. Such a lift blower must be placed as near as possible to the centre of gravity of the aircraft in the longitudinal centre plane of the fuselage and in the interior thereof. The restricted space conditions caused thereby lead to such an arrangement of an elongated power unit, that the centre of gravity of the aircraft is located relatively far in front of its ideal location, this situation being termed nose-heaviness.

In a modern aircraft having a considerable horizontal speed and a slender fuselage it is advantageous to use the above-mentioned, single elongated power unit for the lateral thrust nozzles instead of a relatively wide double power unit.

Summary of the invention

In accordance with the invention the idea has been conceived to install the jet power unit with its charger to the rear of an aircraft, thus placing the centre of gravity of the power unit remarkably far to the rear of the centre of gravity of the aircraft. Incoming air is conducted past the power unit and diverted behind the power unit through 180° to make it possible to situate the heavy compressor to the rear. A very noticeable advantage of this rearward shifting of the weight centre of the power unit is that no additional actuation of control jets is required to correct aircraft nose-heaviness and valuable fuselage space located forwards of the jet power unit becomes available to accommodate other important structural components or payloads.

If the rearward displacement creates a tail-heavy moment, it becomes possible to balance it out with additional payload in the front of the aircraft. It is, e.g., possible to arrange two or three seats in tandem fashion without additional stern ballast. This was not possibe heretofore. The seats of prior aircraft had to be juxtaposed, which however cannot be brought into harmony with the required degree of slenderness of fast aircraft.

A further inventive concept is installation of the power unit in the fuselage inclined downwardly towards the front of the fuselage. In this case, the rear pilot seat may be arranged above the front end of the power unit. It is thus possible to shift the pilots' seats further back in the fuselage. In front of these seats and below them further space becomes available for installing weapons, ammunition or other gear. The seats are staggered vertically, becoming progressively higher towards the rear of the fuselage and each member of the crew therefore has a clear view forward. Moreover the landing gear may be arranged in a structurally more favourable region, due to the shift in the centre of gravity.

Brief description of the drawings

The invention will be described further, by way of example, with reference to the accompanying drawings, in which:

FIG. 1 is a longitudinal section through an aircraft with three pilot seats arranged in tandem and with its centre of gravity shifted rearwards and an elongated power unit installed in a raised position in its fuselage; and FIG. 2 is a longitudinal section through an aircraft with the power unit installed forwardly inclined in the fuselage, the rear pilot seat being located above the front end of the power unit.

Description of the preferred embodiments

In the example shown in FIG. 1, an elongated jet power unit 1 is so installed parallel to the longitudinal axis of the fuselage of an aircraft, that the centre of gravity TS of the power unit is spaced rearwardly a distance y from the centre of gravity FS of the aircraft. The raised position of the power unit leaves a fuselage space 2 free. Elongated jet power units 1 have a centre of gravity shifted fairly far in the direction of one end. Such power units have hitherto been installed with their heavier end forwardly in the fuselage.

In VTOL aircraft, best installation conditions are obtained if the centre of gravity of the power unit 1 is located behind the centre of gravity of the aircraft.

If the power unit is installed inclined to the longitudinal axis of the fuselage, as shown in FIG. 2, then the utilization of space is particularly advantageous. A rear pilot seat 3 of several seats arranged in tandem fashion may, in that case, be arranged raised above the front end of the power unit 1. Thus a relatively large space 2 for an additional load may be maintained below the power unit 1.

Additional space 4 is also available beneath the upwardly staggered pilot seats.

Lateral defining walls 5 and 6 of the loading space 2 at the same time form the shaft walls for installing and dismounting the power unit in a downward direction.

We claim:

1. A VTOL aircraft comprising a fuselage, said aircraft, absent its power unit, having a nose heavy torque about the transverse axis through the center of gravity of the aircraft, a single elongated jet power unit within said fuselage having thrust nozzles arranged exterior of the fuselage and forward and rearward of the transverse axis, said power unit having one end heavier than the other, said heavier end disposed to the rear of the transverse axis, the center of gravity of said power unit disposed rearwardly of the center of gravity of the aircraft.

2. A VTOL aircraft as claimed in claim 1, said elongated power unit inclined downwardly toward the front of the aircraft, further comprising a seat positioned above the front end of the power unit.

3. A VTOL aircraft as claimed in claim 2, further comprising several seats arranged in tandem fashion staggered vertically relative to one another to permit a clear view to the front from each seat, with a useful space formed below the seats.

4. A VTOL aircraft as claimed in claim 1, said elongated jet power unit raised in the interior of the aircraft, a space below said power unit for additional loading, the lateral defining walls of said additional loading space forming the defining walls for a shaft for installing and lowering the power unit from the interior of the aircraft downwards.

References Cited

UNITED STATES PATENTS

| | | | |
|---|---|---|---|
| 2,638,740 | 5/1953 | Sammons | 244—55 |
| 2,868,477 | 1/1959 | Chaplin | 244—12 |
| 3,155,342 | 11/1964 | Bolkow et al. | 244—12 |
| 3,168,998 | 2/1965 | Eichholtz | 244—55 X |
| 3,237,891 | 3/1966 | Wotton | 244—55 |
| 2,812,912 | 11/1957 | Stevens et al. | 244—52 |
| 2,987,271 | 6/1961 | Heath et al. | 244—54 |
| 3,117,750 | 1/1964 | Snell | 244—52 |

FOREIGN PATENTS 1,085,765   7/1960   Germany.

OTHER REFERENCES

Aviation Week, Feb. 25, 1957, p. 191.

MILTON BUCHLER, Primary Examiner